UNITED STATES PATENT OFFICE.

EDWARD D. KENDALL, OF NEW YORK, N. Y.

COMPOSITION OF MATTER FOR ELECTROLYTIC DEPOSITION.

SPECIFICATION forming part of Letters Patent No. 724,107, dated March 31, 1903.

Application filed September 17, 1902. Serial No. 123,760. (No specimens.)

*To all whom it may concern:*

Be it known that I, EDWARD D. KENDALL, a citizen of the United States, residing in the borough of Brooklyn, in the city and State of New York, have invented a new and useful Composition of Matter to be Used for the Electrolytic Deposition of Gold, of which the following is a specification.

The object of my invention is to obtain a solid composition of matter which by mere solution in water furnishes an electrolyte available for the electrolytic deposition of gold by means of an electric current of low electromotive force.

In carrying out my invention I first prepare an aurate, preferably of potassium, then dissolve this aurate in an aqueous solution of a suitable ferrocyanid—for example, potassium ferrocyanid—and then evaporate this liquid to dryness. To make the potassium aurate, auric oxid may first be prepared in the usual way by precipitation with magnesia, the auric oxid to be dissolved in caustic alkali; but I have found that a more simple method yields equally satisfactory results. I usually proceed as follows: I first make gold trichlorid in the customary way by dissolving one part of gold in nitrohydrochloric acid and driving off excess of acid on the water-bath. I dissolve this gold salt in a small quantity of water and then slowly with constant stirring add this solution to, preferably, somewhat more than an equivalent quantity of potassium hydroxid—say two parts, more or less, of potassium hydroxid dissolved in a small quantity of water. Then I add to the liquid and stir into the same a considerable quantity—say twenty parts—of solid powdered potassium ferrocyanid, finally evaporating the whole to dryness on the water-bath with occasional stirring. The resulting solid product is my said composition of matter, which, with or without further addition of potassium ferrocyanid for the purpose of increasing the electric conductivity of any otherwise very dilute solutions of the said composition and with or without the addition of common salt or any other salt for the same purpose, I generally grind to powder and put into bottles that should be well stoppered.

The proportionate quantity of water to be used in forming an electrolyte by solution of my above-described composition of matter of course may vary within wide limits. An ounce of the solid compound may be dissolved in ten fluid ounces of water or in fifty.

What I desire to secure by Letters Patent of the United States is—

1. The herein-described composition of matter consisting of a suitable aurate and a suitable ferrocyanid, substantially as described and for the purpose specified.

2. The herein-described composition of matter for preparing an electrolyte to be used for the electrolytic deposition of gold, consisting of potassium aurate with a small excess of alkali-metal hydroxid and a large excess of potassium ferrocyanid, substantially as described.

In testimony whereof I have signed my name to this specification in the presence of two subscribing witnesses.

EDWARD D. KENDALL.

Witnesses:
GUSTAV CIMIOTTI,
FREDK. C. BIERMANN.